United States Patent
Gysin

(10) Patent No.: US 6,940,196 B2
(45) Date of Patent: Sep. 6, 2005

(54) HIGH-SPEED ROTOR

(75) Inventor: Hansjürg Gysin, Giez (CH)

(73) Assignee: MS-Technologies GmbH, Hasle-Ruegsau (CH)

(*) Notice: Subject to any disclaimer, the term of this patent is extended or adjusted under 35 U.S.C. 154(b) by 68 days.

(21) Appl. No.: 10/628,046

(22) Filed: Jul. 25, 2003

(65) Prior Publication Data

US 2004/0070306 A1 Apr. 15, 2004

(30) Foreign Application Priority Data

Jul. 26, 2002 (EP) .......................................... 02078061

(51) Int. Cl.[7] ................................................ H02K 1/27
(52) U.S. Cl. ...................... 310/156.28; 310/42; 310/45; 310/156.29; 310/262
(58) Field of Search ................................ 310/261, 262, 310/42, 43, 45, 156.28, 156.29

(56) References Cited

U.S. PATENT DOCUMENTS 4,633,113 A * 12/1986 Patel ...................... 310/156.28
6,242,833 B1 * 6/2001 Mobius et al. ......... 310/156.01
2002/0084710 A1 7/2002 Worley et al.

FOREIGN PATENT DOCUMENTS

| DE | 3622231 | 7/1988 |
|---|---|---|
| DE | 10060121 | 6/2002 |
| EP | 1223662 | 7/2002 |
| JP | 03074151 | 3/1991 |
| JP | 2000014062 | 1/2000 |

* cited by examiner

*Primary Examiner*—Burton Mullins
(74) *Attorney, Agent, or Firm*—Darby & Darby

(57) ABSTRACT

A high-speed rotor, in particular a permanent-magnet rotor (1) for dynamoelectric machines of high power density, and also its production are proposed. The permanent-magnet rotor (1) comprises a spindle (2) and armouring (4) coaxial with the spindle (2), a number of ceramic permanent magnets (3a–3d) that are distributed between the spindle (2) and the cylindrical sheath (4), and also a gap-filling filling compound. Said filling compound made of filled polymers seals the gaps in the permanent-magnet rotor (1) by injection moulding. Due to the remanent pretension, the permanent magnets (3a–3d) remain permanently rigidly joined even against high centrifugal forces.

25 Claims, 1 Drawing Sheet

Detail A

Detail B

HIGH-SPEED ROTOR

The invention relates to a high-speed rotor that is preferably constructed as a permanent-magnet rotor and that comprises a spindle having two shoulders, a number of permanent-magnet rods lying parallel to the axis of said spindle and distributed over the periphery of said spindle, and also to a cylindrical sheath enclosing the permanent-magnet rods and a filling of the gaps between said parts, and also to a method of assembling the parts to form a rigid unit.

Permanent-magnet rotors of electrical machines are known that have been developed for maximum power density. Common features of such dynamoelectric machines, which are used as generators on exhaust turbochargers, flywheel storage devices, or as motors for driving spinning turbines, centrifuges or high-speed grinding spindles, are the high rotational speed of the rotors ($n\sim10^5$) and their extreme stressing by the prevailing centrifugal forces. Modern permanent magnets have to be highly remanent, that means that, after induction with an electromagnetic, they retain indefinitely much of the magnetism obtained. At the same time, they should be lighter than metal magnets in order to cause lower centrifugal forces. For said reasons, the favourites are the permanent magnets produced from metal oxides of rare earths by sinter pressing. The design of the permanent-magnet rotors has to ensure that the high shock sensitivity and the low tensile and torsional strength of the sintered-ceramic permanent magnets are compensated for by the use of a corset-like permanent-magnet holding device in such a way that they are only pressure-loaded by the centrifugal forces. The corset-like holding device is preferably formed from high-strength, light, weight-saving construction materials that are electrically as well as magnetically neutral. Such materials are winding laminates having a high fibre component made of synthetic-resin impregnated aramid fibres, carbon fibres and also glass fibres. A further problem relating to permanent-magnet rotor design is that the surfaces of the ceramic permanent magnets cannot be joined or bonded well to synthetic resins. In other words, the use of ceramic permanent magnets necessitates a corset-like holding device for the precise arrangement and positioning of said parts so that the bonding of the parts can be dispensed with.

These requirements are only fulfilled to a limited extent by the proposals in the prior-art publications, such as DE3224904, EP0996212 and US-1999000420862. The proposals for a solution show the rotor with an enclosing cylindrical shell, which is also termed armouring and is used for holding the magnets and also for the pretensioning generated by the shrinkage force so that the sheath is expanded by heating during assembly. A further solution for the permanent positioning of the magnets by pretensioning is that the latter is generated with two conical wedges that are placed in the pole gaps and can be pushed into one another, or by two centred conical parts that fit into one another and that are intersplined in the centre of the rotor or, alternatively, in their periphery. The pretensioning generated in this way holds the magnets permanently and firmly in position regardless of size and the existence of centrifugal force.

The failure of high-power rotors, however, shows that the prior-art solutions are not perfect enough. The reason for this apparently lies in the local stress peaks and, consequently, in the lack of uniformity in the stress distribution in rotors of this type. After all, local stress peaks inevitably result in local overloading and in the rupture or local fatigue of the materials, and these result in loosening and displacement of the components. Because of the high rotational speeds, the smallest change in position of the parts in the rotor manifests itself as an imbalance, and this results in local contact of the rotor with the stator, and in fracture of the rotor spindle or even in the explosion of the rotor.

The object of the present invention is to develop further the permanent-magnet rotors of the type described at the outset and also the production of modified designs so that a novel permanent-magnet rotor is produced that has substantially increased operational safety and increased power.

This object is achieved by the homogeneous stress distribution of the complete permanent-magnet rotor and its components. For this purpose, shoulders are formed in the two end regions of the rotor spindle so that a wide annular channel is produced between the shoulders for receiving the permanent-magnet rods. During assembly, the permanent-magnet rods can be placed in said annular channel, preferably in the vertical position of the spindle. Inserts made of electrically and magnetically neutral materials are provided for the segmented positioning of the permanent-magnet rods. The assembly of the parts is finished with the mounting of the armouring by pushing a thin-wall cylinder over the spindle shoulders and the collar of the positioned permanent-magnet rods. For the purpose of bonding and for the purpose of pretensioned sealing of the individual parts, the assembled permanent-magnet rotor can be locally heated and/or cooled according to the rheological process-control needs and filled with a curable moulding compound by pressing. The pretensioning achieved in the parts of the permanent-magnet rotor decreases to some extent with the curing and the shrinkage of the moulding compound, but this can be taken into account when specifying the extrusion parameters. To be regarded as a particular advantage is the fact that the production process is rational and inexpensive compared with the prior art as a result of the proposed construction.

The invention is explained below using diagrammatic drawings of a design variant as follows.

Figure 1:
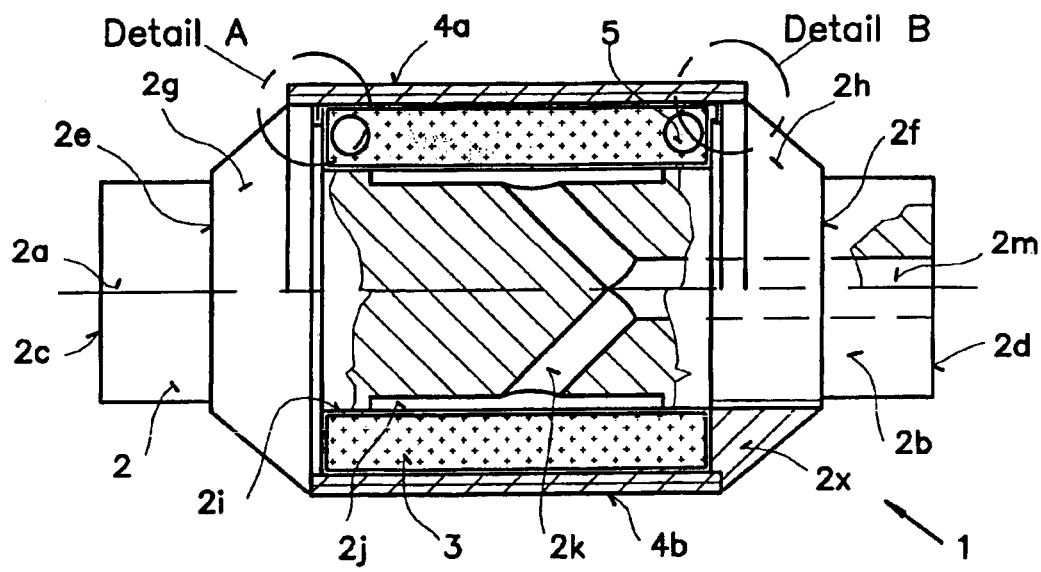
FIG. 1 shows the novel permanent-magnet rotor with various detail solutions, in a partial longitudinal section.

The permanent-magnet rotor 1 shown in FIG. 1 comprises the rotor spindle 2, the permanent magnets 3, the armouring 4 and a filling compound that is injected into the cavities of the permanent-magnet rotor 1 and is not shown. The permanent-magnet rotor 1 terminates in each case in the shaft studs 2a, 2b that extend from the spindle ends 2c, 2d up to the spindle collar 2e, 2f and serve to receive the mounting of the permanent-magnet rotor 1, which is not shown. Adjacent to the spindle collars 2e, 2f are the spindle shoulders 2g and 2h, which each comprise a truncated cone having a cylindrical shelf and a descending step. An annular channel 2i for receiving the permanent magnets 3 lies between the spindle shoulders 2g and 2h and, at the base of the annular channel 2i, there is at least one recess 2j that is joined to the radial supply channels 2k and the connecting channel 2m in the spindle axis. The armouring 4a surrounds either the spindle shoulder 2g, 2h or, as an alternative, the armouring 4b is clamped coaxially to the rotor spindle 2 between the spindle shoulder 2g and the spindle nut 2x.

Figure 2:
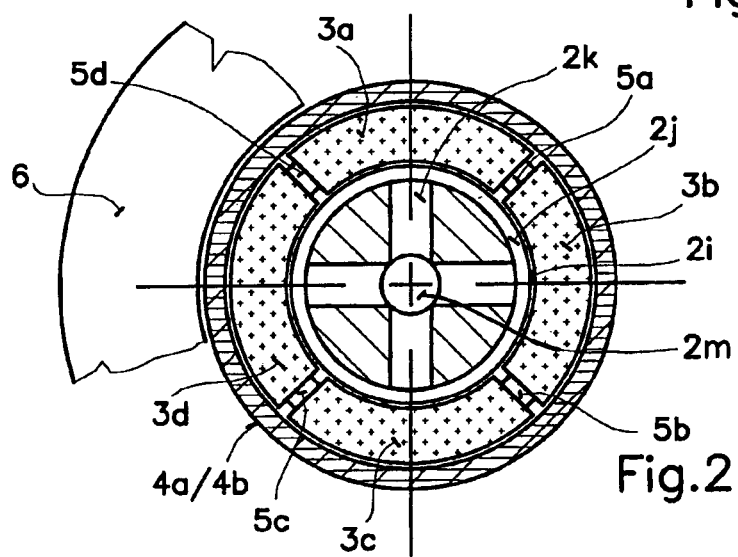
FIG. 2 shows the cross section of the permanent-magnet rotor shown in FIG. 1 and the use of a device for its centred assembly.

FIG. 2 shows, in the cross section of the permanent-magnet rotor 1, the circular arrangement of the permanent magnets 3a–3d and the cavities that surround the permanent magnets 3a–3d and are joined to the radial supply channels 2k and the connecting channel 2m in a communicating manner by the annular channel 2i and the recess 2j. The segmented arrangement of the permanent magnets 3a–3d is achieved by inserts 5a–5d that are composed of electrically and magnetically neutral materials, for example of glass ceramic, and are preferably positioned between the spindle shoulders 2g, 2h and the recess 2j.

Depending on the design of the rotor spindle 2, the armouring 4a, 4b is pushed over the spindle shoulders 2g, 2h or clamped between the spindle shoulder 2g and the spindle nut 2x. To seal the joints produced between the spindle shoulders 2g, 2h and the armouring 4a, or the spindle shoulder 2g and the armouring 4b and the spindle nut 2x, the use of sealing rings is proposed. These may be of commercial type, or may, in particularly suitable designs, be in accordance with the details A and B of FIG. 1 (cf. their enlargement in FIGS. 3 and 4).

Furthermore, the use of a centring ring 6 is proposed in FIG. 2 to limit the asymmetrical expansion of the armouring 4a, 4b. For this purpose, the centring ring 6 is oriented by the bearing bushes on the spindle stub 2a, 2b of the permanent-magnet rotor 1 so that the desired air gap 6a with the stator of the electrical machine is produced after the pressure extrusion of the filling compound and its curing around the armouring 4a, 4b.

Figure 3:
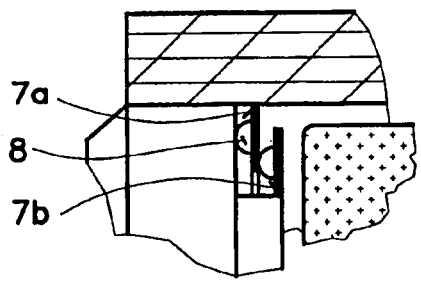
FIG. 3 shows a dynamic labyrinth seal of the rotor armouring (detail A in FIG. 1).

FIG. 3 shows the detail A of FIG. 1 and, consequently, the proposal for sealing the joint that is produced by the armouring 4a and the spindle shoulder 2g. This is a labyrinth seal that, in contrast to the known type of notched grooves arranged in series, comprises, however, at least two washer rings 7a, 7b. The washer rings 7a, 7b are centred alternately on the armouring 4a and on the shelf of the spindle shoulder 2g (or as an analogous design not shown, on the armouring 4b and a shelf of the spindle nut 2x) and have spacing knobs 8 in places so that they retain a spacing from one another and from the spindle shoulder. In the pretensioned sealing of the permanent-magnet rotor 1, the washer rings 7a, 7b guide the advancing filling compound. The varying resistance of the filling compound around and between the washer rings 7a, 7b, 7n reduces the pressure of the filling compound so that the gap between the armouring and the spindle shoulder (spindle nut) is filled.

Figure 4:
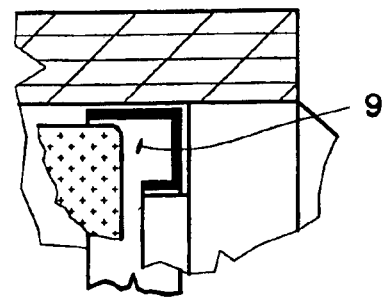
FIG. 4 shows an elastic and plastic seal of the rotor armouring (detail B in FIG. 1).

FIG. 4 shows the detail B of FIG. 1 and, consequently, a further proposal for sealing the joint in accordance with the object formulated in the description of FIG. 3. Here, the use of a cuff preferably strengthened with sheet metal and having sealing lips made of natural or synthetic rubber (9) is proposed.

The use of a curable synthetic resin moulding compound is suitable for the purpose of pretensioned sealing. Such moulding compounds are composed of epoxy resin or of unsaturated polyester, but also of phenol-formaldehyde and melamine-formaldehyde, as well as a mixture of the two. The extrusion pressure is 600 to 2500 bar. The pretension achievable after the curing of the moulding compound is 600 to 1200 bar. To reduce the shrinkage of the moulding compound, it is advisable to use fillers such as microbeads and hollow microbeads (10–200 $\mu$m) made of glass and ceramic with a proportion by volume of resin of 50%.

The cavities in the permanent-magnet rotor 1 are filled with the moulding compound through the connecting channel 2m and the supply channels 2k, branched therefrom, of the rotor spindle 2, in accordance with FIGS. 1 and 2, via the recess 2j and the annular channel 2i around the segments of the permanent magnets 3a to 3c and up to and with wetting of the inner surface of the armouring 4a, 4b. In this process, the air filling the cavities escapes through the joints (of the armouring 4a, 4b with the spindle shoulders 2g, 2h or spindle nut 2x) or is compressed by the high pressure of the moulding compound until it is imperceptible.

The rheological behaviour of the moulding compound in the extrusion pressing process can expediently be controlled by thermal measures. Local cooling, for example using Peltier elements, makes it possible to dissipate excess frictional and process heat and consequently to delay the curing of the filling compound. The partial crosslinking of the filling compound can be brought about by local heating of the joints, for instance with electrical heating blankets and, consequently, the tight sealing of the critical joints can be achieved.

These measures can be applied in accord with the use of the centring ring 6 indicated in FIG. 2 for limiting the asymmetrical expansion of the armouring 4a, 4b so that the desired air gap 6a relative to the stator of the electrical machine is produced around the permanent-magnet rotor 1.

To complete the manufacture of the permanent-magnet rotors 1 there follows static and dynamic counterbalancing by controlled abrasion of parts having mass so that the rotational axis and the axis through the centre of gravity of the rotor coincide. Suitable for abrasion are the spindle shoulders 2g, 2h and also the spindle nut 2x of the permanent-magnet rotor 1. The procedure for these measures shortens the precise manufacture and the assembly of the parts and, not least, the restriction of the asymmetrical expansion of the armouring 4a, 4b during the pretensioned sealing.

What is claimed is:

1. A high-speed, permanent-magnet rotor (1) for dynamo-electric machines of high power density, comprising at least one spindle (2), a cylindrical sheath (4) coaxial with the spindle (2), and a plurality of permanent magnets (3a to 3c) distributed between the spindle (2) and the cylindrical armouring sheath (4), characterized in that the spindle (2) has on its cylindrical circumference at least one spindle shoulder (2g, 2h), at least one annular channel (2i) for receiving the permanent magnets (3a to 3c), and at least one recess (2j), and the cylindrical armouring sheath (4a, 4b) consists of synthetic-resin impregnated, filament-wound fibers, wherein all cavity parts of the rotor (1) are filled through a connecting channel (2m) that is located co-centric with the spindle axis, radial supply channels (2k) that branch from the connecting channel (2m), and the at least one recess (2j) using a high-pressure, compressed and cured filling compound used for pretensioned sealing and rigid joining of the permanent magnets (3a to 3c), inserts (5a to 5d) which segment the permanent magnets (3a to 3c) from one another, and the inner surface of the armouring sheath (4a, 4b).

2. The high-speed rotor according to claim 1, characterized in that the spindle (2) has at least one spindle shoulder (2g, 2h) at least one spindle nut (2x), and the at least one annular channel (2i) lies between the spindle shoulder (2g, 2h) and the spindle nut (2x).

3. The high-speed rotor according to claim 2, characterized in that the supply channel (2m) of the spindle (2) is connected to the radial supply channels (2k) in a symmetrical manner and to the at least one recess (2j) of the spindle (2).

4. The high-speed rotor according to claim 3, characterized in that cylindrical shell-type armouring (4a) is situated on the spindle shoulders (2g, 2h).

5. The high-speed rotor according to claim 2, characterized in that the cylindrical shell-type armouring (4b) is clamped between the spindle shoulder (2g) and the spindle nut (2x).

6. The high-speed rotor according to claim 1, characterized in that cylindrical shell-type armouring (4a) is situated on the spindle shoulders (2g, 2h).

7. A method of producing a high-speed rotor according to claim 1, characterized in that the rotor (1) is thermally treated in places.

8. The high-speed rotor according to claim 1, characterized in that the supply channel (2m) of the spindle (2) is connected to the supply channels (2k), which are symmetrically distributed, and to the at least one recess (2j) of the spindle (2).

9. The high-speed rotor according to claim 1, wherein the synthetic-resin impregnated, filament-wounded fibers are carbon fibers.

10. The high-speed rotor according to claim 1, wherein the synthetic-resin impregnated, filament-wounded fibers are aramid fibers.

11. The high-speed rotor according to claim 1, wherein the synthetic-resin impregnated, filament-wounded fibers are glass fibers.

12. A high-speed, permanent-magnet rotor (1) for dynamoelectric machines of high power density, comprising at least one spindle (2), a cylindrical sheath (4) coaxial with the spindle (2), and a plurality of permanent magnets (3) distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has spindle shoulders (2g, 2h) and at least one supply channel (2m) for feeding the filling compound, and there lies between the spindle shoulders (2g, 2h) an annular channel (2i) that receives the permanent magnets (3, 3a to 3c), and inserts (5a to 5d) made of electrically non-conductive materials are used for the segmented positioning of the permanent magnets (3a to 3c).

13. The high-speed rotor according to claim 12, characterized in that cylindrical shell-type armouring (4a) is situated on the spindle shoulders (2g, 2h).

14. A high-speed, permanent-magnet rotor (1) for dynamoelectric machines of high power density, comprising at least one spindle (2), a cylindrical sheath (4) coaxial with the spindle (2), and a number of bodies (3) that are distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has at least one spindle shoulder (2g, 2h) and at least one spindle nut (2x), at least one annular channel (2i) lies between the spindle shoulder (2g, 2h) and the spindle nut (2x), and at least one supply channel (2m) for feeding the filling compound, wherein the cylindrical shell-type armouring (4b) is clamped between the spindle shoulder (2g) and the spindle nut (2x).

15. The high-speed rotor according to claim 14 characterized in that externally and internally centering washer rings (7a, 7b) having spacing knobs (8) seal the points of contact of the spindle (2, 2g, 2h, x) and the armouring (4a, 4b).

16. A method of producing a high-speed rotor according to claim 15, characterized in that the rotor (1) is placed in a centering ring (6) guided by the rotor spindle (2) to limit the asymmetrical expansion of the armouring (4a, 4b).

17. The high-speed rotor according to claim 14, characterized in that a cuff strengthened with sheet metal and having sealing lips made of natural or synthetic rubber (9) seals the points of contact of the spindle (2, 2g, 2h, 2x) and the armouring (4a, 4b).

18. A method of producing a high-speed rotor according to claim 19, characterized in that the rotor (1) is placed in a centering ring (6) guided by the rotor spindle (2) to limit the asymmetrical expansion of the armouring (4a, 4b).

19. A method of producing a high-speed rotor according to claim 14, characterized in that the rotor (1) is placed in a centering ring (6) guided by the rotor spindle (2) to limit the asymmetrical expansion of the armouring (4a, 4b).

20. A method of producing a high-speed rotor according to claim 14, characterized in that the rotor (1) is placed in a centering ring (6) guided by the rotor spindle (2) to limit the asymmetrical expansion of the armouring (4a, 4b).

21. A high-speed, permanent-magnet rotor (1) for dynamoelectric machines of high power density, comprising at least one spindle (2), a cylindrical sheath (4) coaxial with the spindle (2), and a plurality of permanent magnets (3) that are distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has at least one spindle shoulder (2g, 2h) and at least one spindle nut (2x), the supply channel (2m) of the spindle (2) is connected to symmetrically distributed supply channels (2k) and to at least one recess (2j) of the spindle (2), there lies between the spindle shoulder (2g, 2h) and the spindle nut (2x) an annular channel (2i) that is used to receive the permanent magnets (3, 3a to 3c), and inserts (5a to 5d) made of electrically non-conductive materials are used for the segmented positioning of the permanent magnets (3a to 3c).

22. A high-speed, permanent-magnet rotor (1) for dynamoelectric machines of high power density, comprising at least one spindle (2), a cylindrical sheath (4) coaxial with the spindle (2), and a plurality of permanent magnets (3) that are distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has at least one spindle shoulder (2g, 2h) and at least one spindle nut (2x), and at least one supply channel (2m) for feeding the filling compound is connected to symmetrically distributed supply channels (2k) and to at least one recess (2j) of the spindle (2), there lies between the spindle shoulder (2g, 2h) and the spindle nut (2x) an annular channel (2i) that is used to receive the permanent magnets (3a to 3c), and inserts (5a to 5d) made of electrically non-conductive materials are used for the segmented positioning of the permanent magnets (3a to 3c).

23. A high-speed, permanent-magnet rotor (1) for dynamoelectric machines of high power density, comprising at least one spindle (2), a cylindrical sheath (4) coaxial with the spindle (2), and a plurality of permanent magnets (3) that are distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has at least one spindle shoulder (2g, 2h), at least one spindle nut (2x), at least one annular channel (2i) that lies between the spindle shoulder (2g, 2h) and the spindle nut (2x), and at least one supply channel (2m) for feeding the filling compound, the supply channel (2m) of the spindle (2) is connected to symmetrically distributed supply channels (2k) and to at least one recess (2j) of the spindle (2), and the cylindrical shell-type armouring (4b) is clamped between the spindle shoulder (2g) and the spindle nut (2x).

24. A high-speed, permanent-magnet rotor (1) for dynamoelectric machines of high power density, comprising at least one spindle (2), a cylindrical sheath (4) coaxial with the spindle (2), and a plurality of permanent magnets (3) distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4), the spindle (2) has spindle shoulders (2$g$, 2$h$), at least one annular channel (2$i$) that lies between the spindle shoulders (2$g$, 2$h$), and at least one supply channel (2$m$) for feeding the filling compound, cylindrical sheath (4$a$) is situated on the spindle shoulders (2$g$, 2$h$), and externally and internally centering washer rings (7$a$, 7$b$), have spacing knobs (8) used to seal the points of contact of the spindle (2, 2$g$, 2$h$, x) and the armouring (4$a$, 4$b$).

25. A high-speed, permanent-magnet rotor (1) for dynamoelectric machines of high power density, comprising at least one spindle (2), a cylindrical sheath (4) coaxial with the spindle (2), and a plurality of permanent magnets (3) distributed between the spindle (2) and the cylindrical sheath (4), characterized in that a cavity-filling, compressed and cured filling compound is used for the pretensioned sealing and rigid joining of the rotor, spindle, magnets, and sheath (1,2,3,4,), the spindle (2) has spindle shoulders (2$g$, 2$h$), at least one annular channel (2$i$) that lies between the spindle shoulders (2$g$, 2$h$), and at least one supply channel (2$m$) for feeding the filling compound, the cylindrical sheath (4$a$) is situated on the spindle shoulders (2$g$, 2$h$), and a cuff strengthened with sheet metal and having sealing lips made of natural or synthetic rubber (9) is used to seal the points of contact of the spindle (2, 2$g$, 2$h$, 2$x$) and the cylindrical sheath (4$a$, 4$b$).

\* \* \* \* \*

UNITED STATES PATENT AND TRADEMARK OFFICE
CERTIFICATE OF CORRECTION

PATENT NO. : 6,940,196 B2
DATED : September 6, 2005
INVENTOR(S) : Gysin

It is certified that error appears in the above-identified patent and that said Letters Patent is hereby corrected as shown below:

Title page,
Item [73], Assignee, please delete "MS-Technologies GmbH, Hasle-Ruegsau (CH)" and substitute -- MS-Technologie GmbH, Hasle-Ruegsau (CH) --.

Signed and Sealed this

Thirteenth Day of December, 2005

JON W. DUDAS
*Director of the United States Patent and Trademark Office*